United States Patent [19]
Ridley et al.

[11] Patent Number: 6,095,712
[45] Date of Patent: Aug. 1, 2000

[54] MOTOR VEHICLE STEERING LINKAGE BALL JOINT PROTECTIVE CLIP

[75] Inventors: Eric John Ridley, Danbury; David John Richardson, Rayleigh; Douglas William Ivory, Wickford, all of United Kingdom

[73] Assignee: Ford Global Technologies, Inc., Dearborn, Mich.

[21] Appl. No.: 09/114,110

[22] Filed: Jul. 11, 1998

[30] Foreign Application Priority Data

Nov. 7, 1997 [GB] United Kingdom ................... 9714519

[51] Int. Cl.[7] ..................................... F16B 2/24
[52] U.S. Cl. ........................... 403/23; 403/326; 403/329; 188/264 G
[58] Field of Search ............................. 403/23, 329, 326, 403/51; 277/634, 635, 636; 188/264 G

[56] References Cited

U.S. PATENT DOCUMENTS

| | | | |
|---|---|---|---|
| 2,520,725 | 8/1950 | Judd | 403/329 X |
| 3,544,951 | 12/1970 | Roberts | 403/329 X |
| 4,431,090 | 2/1984 | Kinoshita | 188/264 G |
| 4,513,844 | 4/1985 | Hoffman, Jr. | 188/264 G X |
| 5,297,996 | 3/1994 | Draga | 277/636 X |
| 5,653,550 | 8/1997 | Mutz et al. | 403/329 |

*Primary Examiner*—Terry Lee Melius
*Assistant Examiner*—John R Cottingham
*Attorney, Agent, or Firm*—Gregory P. Brown

[57] ABSTRACT

The present invention relates to a protective clip (10) that may be affixed to a motor vehicle steering linkage ball joint (7), and in particular to a clip that presents a heat shield (28) between a rubber sealing gaiter (11) surrounding the ball joint (7) and a brake disc (5), and that also covers over a slot (38) in a steering knuckle (4) above the joint (7). The protective clip 10 has a planar mid-section (24) with a hole (26) therethrough through which a ball mounting shaft (40) may pass. The heat shield (28) extends transversely away from a first edge (30) of the planar mid-section (24). A steering knuckle engaging feature (49) is proximate a second edge (32) of the planar mid-section (24) opposite the first edge (30), the engaging feature (49) being non-coplanar with the planar mid-section. A spring clip (34) extends from the second edge (32) and is concave towards the planar mid-section (24).

9 Claims, 5 Drawing Sheets

MOTOR VEHICLE STEERING LINKAGE BALL JOINT PROTECTIVE CLIP

BACKGROUND OF THE INVENTION

1. Field of the Invention

The present invention relates to a protective clip that may be affixed to a motor vehicle steering linkage ball joint, and in particular to a clip that presents a heat shield between a rubber sealing gaiter surrounding the ball joint and a brake disc, and that also covers over a slot in a steering knuckle above the joint.

2. Disclosure Information

A conventional steering and suspension mechanism for a motor vehicle has a track control arm which turns a front wheel. The track control arm connects to a lower portion of a so-called knuckle which houses the wheel bearing and which also holds a disc brake. An upper portion of the knuckle has a mount for a lower end of a suspension assembly, which is connected to the track arm by a rod.

The joint between the track control arm and the knuckle is conventionally a ball joint which permits relative up and down movement of the wheel and knuckle with respect to the track arm, and which also permits the turning movement of the wheel. The ball joint conventionally has an upwardly facing socket, held at the end of the track arm, and a ball at the end of a downwardly projecting ball mounting shaft. The ball mounting shaft may be either cylindrical or frustoconical. In the latter case, the shaft will sit in a matching tapered bore in the lower portion of the knuckle, with the end of the shaft projecting through a hole and having a thread by which the ball and shaft may be tightened to the knuckle with a nut. In the former case, to which the present invention particularly relates, the knuckle has a straight bore intersected by a slot through the knuckle, and bolt is used to squeeze the knuckle slot, and hence straight bore, to fix the ball and shaft to the lower portion of the knuckle. The knuckle slot is therefore above the ball joint.

In order to keep the ball joint well lubricated, the ball joint is normally surrounded by a rubber gaiter that is packed with grease. The bottom of the gaiter is affixed to a bottom part of the end of the track control arm, and the top of the gaiter makes a sliding contact seal with an underside of the knuckle around the shaft.

In most cases, the knuckle will have affixed to it the disc of a disc brake assembly. In recent years, as cost and weight have been reduced, the spacing between the disc and the rubber gaiter has been reduced. As a result, the heat radiated by a hot disc has resulted in an increasing problem with thermal degradation over time of the rubber material of the gaiter. It is known to provide a metal heat shield between the disc and the rubber gaiter, and this shield can be affixed either to the end of the tracker arm, or to the knuckle. The present invention relates to the latter type of heat shield.

When the heat shield is mounted to the knuckle, it is necessary to align the shield with respect to the disc, because the shield cannot extend fully around the periphery of the gaiter, owing to the shape and configuration of the ball joint. The orientation of conventional heat shields is set by crimping or bending a tab of metal into a slot or against some feature of the knuckle on a face of the knuckle away from the shield and disc assembly. This process is effective at orienting the shield, but requires several process steps on a production line, namely fitting the shield between the socket and ball, turning the shield until it is oriented with the disc, and then folding or crimping the tab into place.

A problem has been noted with certain types of a ball joint and gaiter assemblies, owing to corrosion of the ball joint. Such corrosion happens when water and other contaminants enter the gaiter, and when the steering assembly is not serviced, but neglected for an extended period of time. In severe cases of corrosion, the ball can become disconnected from the socket, usually on the outer wheel during a slow speed manoeuvre at large steering angles.

The provision of a heat shield has reduced this problem by helping to preserve the gaiter. However, corrosion has still been noted as a problem, owing to water ingress into the top of the gaiter.

It is an object of the present invention to provide a protective clip that can be affixed more conveniently to a steering linkage ball joint.

It is also an object of the present invention to provide a protective clip that helps to prevent corrosion of a steering linkage ball joint.

SUMMARY OF THE INVENTION

Accordingly, the present invention provides a protective clip that may be affixed about a motor vehicle steering linkage ball joint, comprising: a planar mid-section with a hole therethrough through which a ball mounting shaft may pass; a heat shield extending transversely away from a first edge of the planar mid-section, and a steering knuckle engaging feature proximate a second edge of the planar mid-section opposite the first edge, the engaging feature being non-coplanar with the planar mid-section, characterised in that a spring clip extends from the second edge and is concave towards the planar mid-section.

The term "transverse" as used herein need not imply a perpendicular arrangement, but encompasses also any direction away from the plane of the mid-section.

The heat shield will most commonly extend transversely away on one side of the plane of the planar mid-section, with the spring clip being arranged on the other side of said plane.

The planar mid-section may be parallel with a face of the inside of the ball joint, such as a flat machined undersurface of the knuckle. Since the engaging feature is non-coplanar with the planar mid-section, it may be used to prevent rotation of the protective clip relative to the ball joint, for example engaging with a groove or a projection on a surface of the knuckle above the machined flat surface.

The protective clip may then be incorporated in a motor vehicle steering linkage, comprising a track control arm and a knuckle connected at a lower portion of the knuckle by a ball joint which is protected by a surrounding gaiter. The ball joint may be of an otherwise conventional form, having an upwardly facing socket held at the end of the track control arm, and a ball at the end of a downwardly projecting ball mounting shaft, which passes through the hole in the planar mid-section of the clip. The shaft may extend inside a bore through the lower portion of the knuckle and be fixed to the knuckle by means of a clamping slot intersecting the bore, also in a conventional manner. The protective clip may then be affixed about the ball joint in such a way that the clip is oriented with respect to the knuckle by clipping the concave spring clip to a corresponding feature of the knuckle. The corresponding feature may be a convex outer surface of the knuckle matching a concave surface of the clip.

In this way, a protective clip may be affixed and oriented with respect to a knuckle in a single process step, for example by press-fitting the clip over a matching feature of the knuckle, so placing the spring clip under tension, and so pulling the spring clip into positive engagement with the knuckle. At the same time, the engaging feature may be pulled into engagement with a corresponding locating feature of the knuckle by the spring bias provided by the clip.

Preferably, the spring clip has a concave shape to oppose the planar mid-section. A part of the knuckle may therefore be clipped between a part of the spring clip opposing the mid-section, and the planar mid-section itself.

In a preferred embodiment of the invention, the spring clip opposes the hole through the planar mid-section.

One way to achieve a suitable clipping arrangement, is to have the spring clip curved into a partial loop towards the planar mid-section.

If the engaging feature is on the spring clip, then the engaging feature may be made to engage with a corresponding locating feature on the knuckle at the same time as the spring clip engages with the knuckle. Where the surface of the spring clip is concave towards the planar mid-section, the engaging feature may project from this concave surface.

One end of the engaging feature may be proximate the second edge of the planar mid-section, for example, at the junction between the planar mid-section and the spring clip.

In a preferred embodiment of the invention the engaging feature is a strap bridging across the surface of the spring clip that is concave towards the planar mid-section. In the case of a spring clip formed from folded, bent and punched steel sheet, the engaging feature may be similarly punched and formed from the sheet, for example in the form of an arch joining with the protective clip at the ends of the arch, a hole remaining in the protective clip from which the arch-like strap was formed.

Surprisingly, it has been discovered that in normal use most of the corrosion of the ball joint, even when a heat shield protects the rubber gaiter from thermal degradation, is caused by water, with entrained road salt and other contaminants running down the knuckle slot. Although this slot and the gaiter are initially packed with grease, once this is subjected to a flow of water, contaminants are eventually born into the gaiter to corrode surfaces of the ball joint.

Therefore, a particular advantage of the invention is that the spring clip may be used to cover over, at least partially and preferably completely, the slot through the knuckle. The spring clip may therefore serve the multiple purposes of providing a biasing force to initially align, with the engaging feature, the protective clip (and hence heat shield) with the knuckle, then to keep this alignment in place, while at the same time covering over a potential path through which corrosive water, salt, grit or other contaminants may reach the ball joint.

It is particularly advantageous if the engaging feature locates with the slot. It is therefore possible to have the protective clip locate with the knuckle, even if the knuckle was not initially designed with any special location features adapted to locate with an engaging feature. The protective clip may therefore be retrofitted to vehicles already in use without any sort of protective clip.

Similarly, it is particularly advantageous if the spring clip clips into an open end of the bore. It is therefore possible to have the spring clip locate in a sprung engagement with the knuckle, even if the knuckle was not initially designed with any special location features adapted to locate with a spring clip.

A steering assembly for a motor vehicle, comprising a disc brake assembly and a motor vehicle steering linkage as described above, may therefore be provided with the heat shield of the protective clip being arranged between a disc of the disc brake assembly and the gaiter.

BRIEF DESCRIPTION OF THE DRAWINGS

The invention will now be further described by way of example, with reference to the accompanying drawings, in which.

DETAILED DESCRIPTION OF THE PREFERRED EMBODIMENTS

Figure 1:
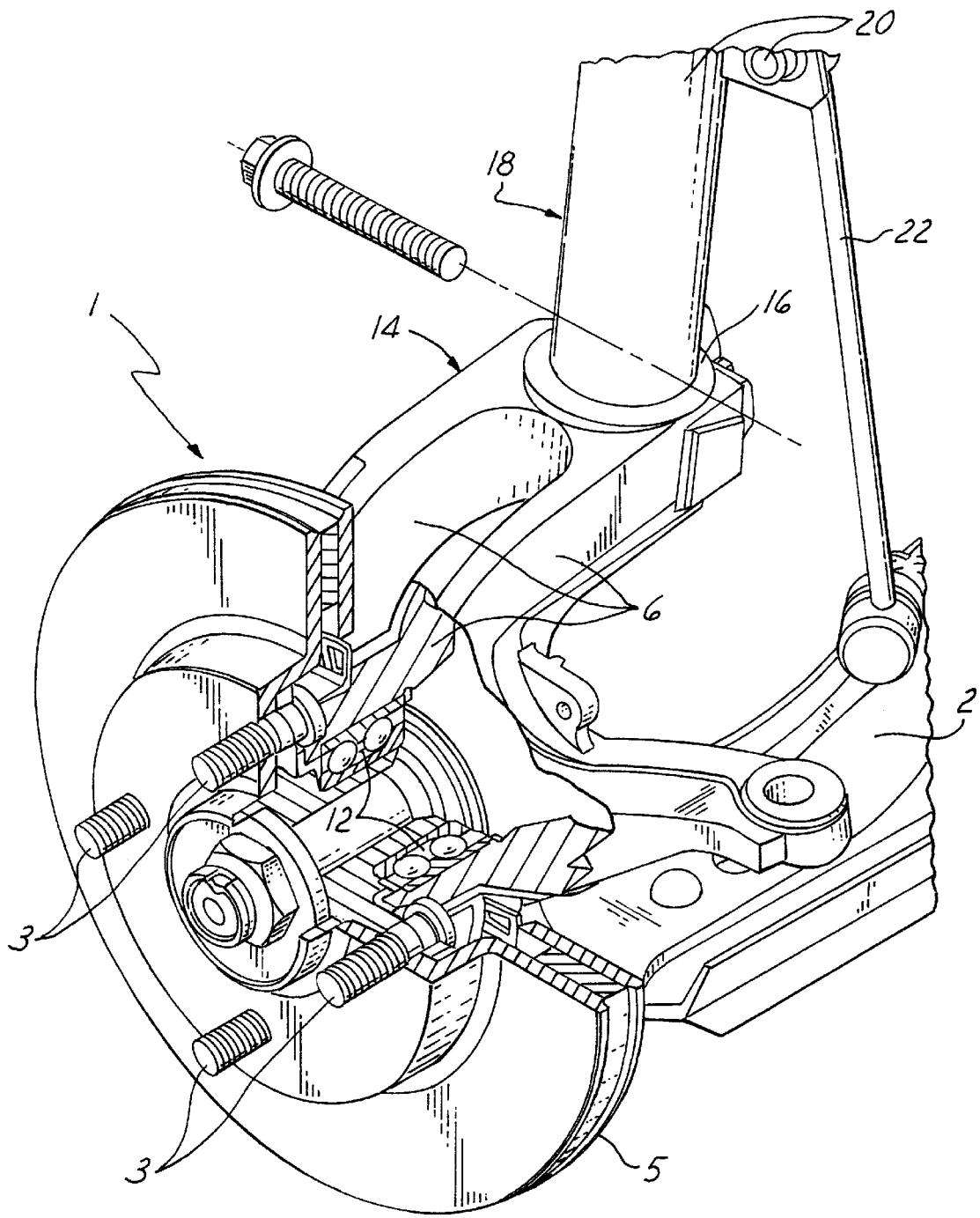
FIG. 1 is a perspective view of a steering assembly for a motor vehicle, showing a disc brake assembly partially cut away to show the knuckle, and part of a motor vehicle steering linkage with a track control arm connected to the knuckle.

FIG. 1 shows a conventional steering and suspension mechanism 1 for the front wheels of a motor vehicle. The mechanism 1 shown is for the right front wheel which, while not illustrated, may be connected to the mechanism by four bolts 3. The mechanism 1 has a disc brake assembly, of which the disc 5 is visible in the drawing.

Figure 2:
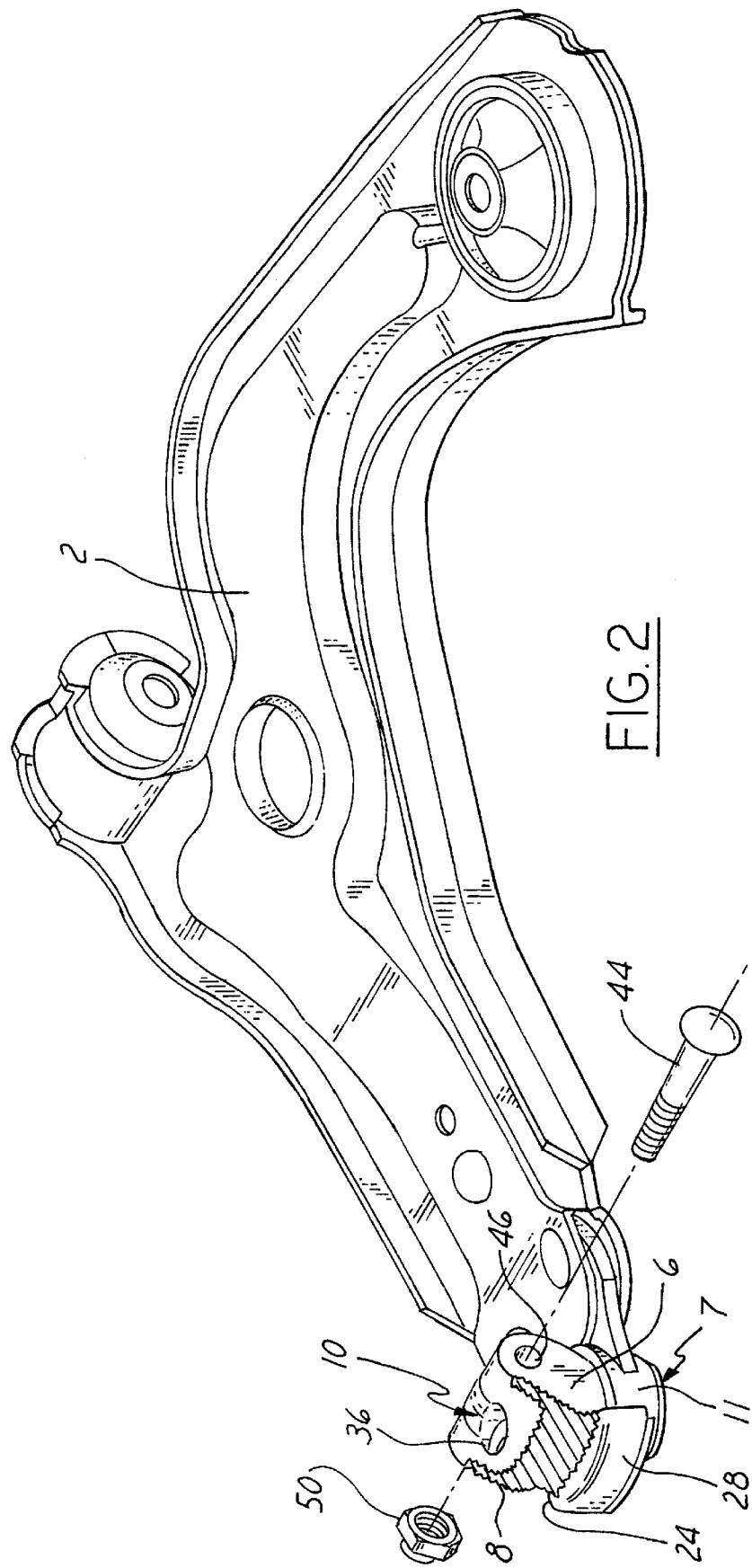
FIG. 2 is a perspective view of the track control arm and a bottom portion of the knuckle of FIG. 1, with a protective clip according to the invention about a ball joint connecting the track control arm with the knuckle.
Figure 3:
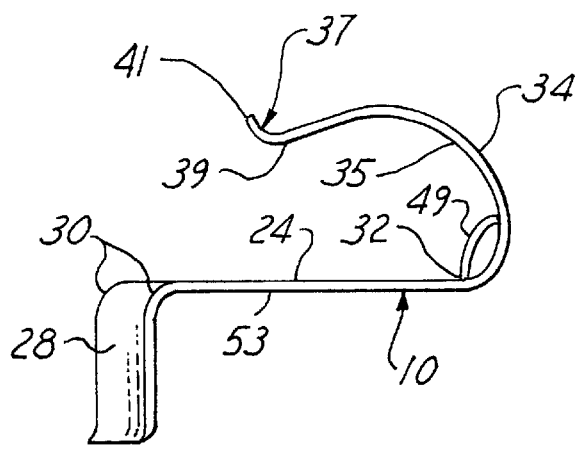
FIGS. 3 to 6 are, respectively side, front, bottom and top views of the protective clip of FIG. 2.
Figure 4:
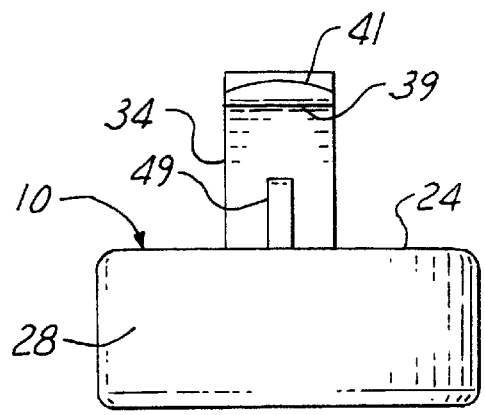
Figure 5:
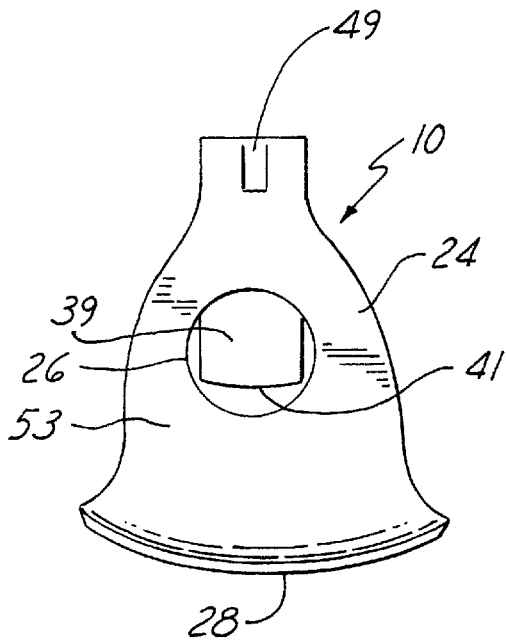
Figure 6:
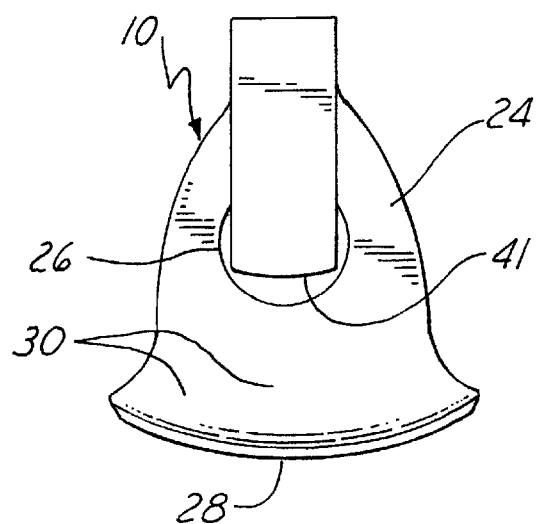

Referring now also to FIG. 2, each front wheel is turned by a track control arm 2 which connects to a so-called knuckle 6 at a lower portion 4 of the knuckle via a ball and socket joint 7. The joint 7 is protected by a surrounding conventional rubber gaiter 11. The knuckle lower portion 4 is drawn in FIG. 2 cut away as indicated by a zigzag line 8 in order to show a protective clip 10 according to the invention.

The disc 5 and knuckle 6 in FIG. 1 are drawn cut away to show a wheel bearing 12 and an upper portion 14 of the knuckle 6, which has a mount 16 for a lower end 18 of a suspension assembly 20. The suspension assembly 20 is connected to the track control arm 2 by a rod 22.

Figure 7:
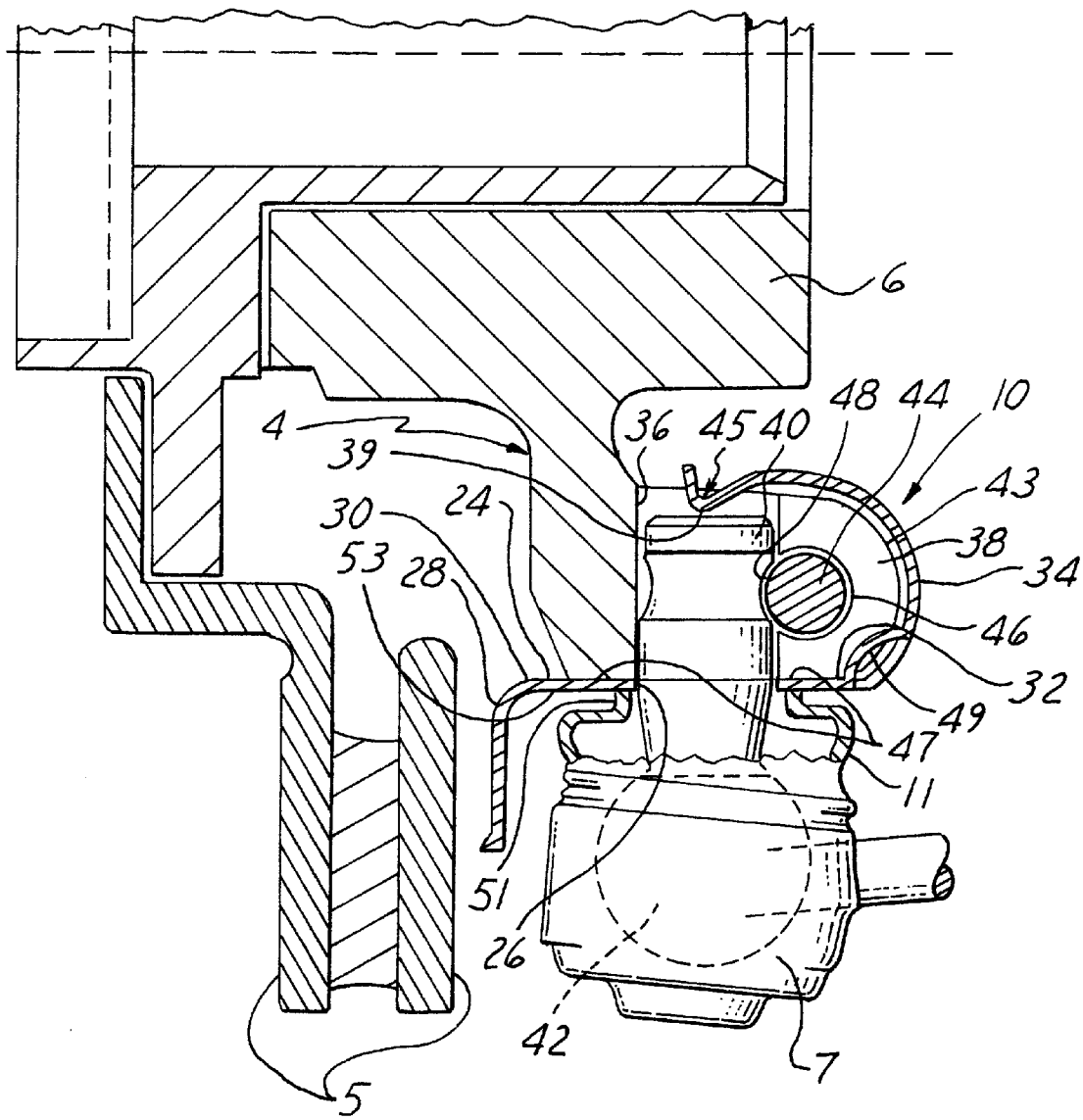
FIG. 7 is a side partial cross-section through a knuckle, brake disc, ball joint and protective clip of FIGS. 1 to 6.

FIGS. 3 to 6 show the protective clip 10 in more detail and FIG. 7 illustrates how the clip is affixed about the ball and socket joint 7. The clip 10 is formed from folded and punched sheet stainless steel, 0.5 mm thick. A flat, planar middle portion or section 24 of the clip 10 has a circular hole 26 near the centre of the middle section.

At a first edge 30 of the planar mid-section 24, a heat shield 28 extends downwards away from the plane of the mid-section. At a second edge 32 of the planar mid-section 24 opposite the first edge 30, a spring clip 34, extends upwards away from the plane of the mid-section.

Figure 8:
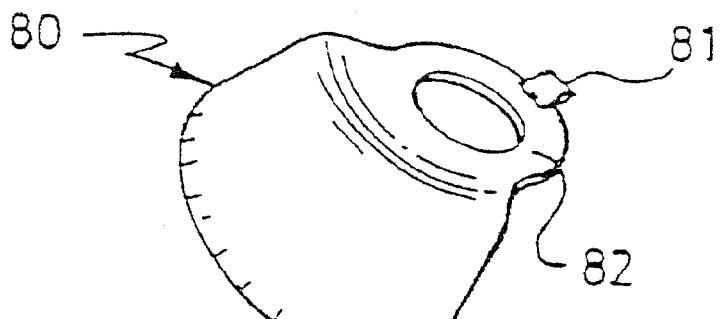
FIGS. 8 to 10 are prior art protective clips that may be affixed about a motor vehicle steering linkage ball joint, each having a heat shield, and an engagement feature which is bent upwards to engage the clip with a knuckle after placement of the clip between the knuckle and the ball joint.
Figure 9:
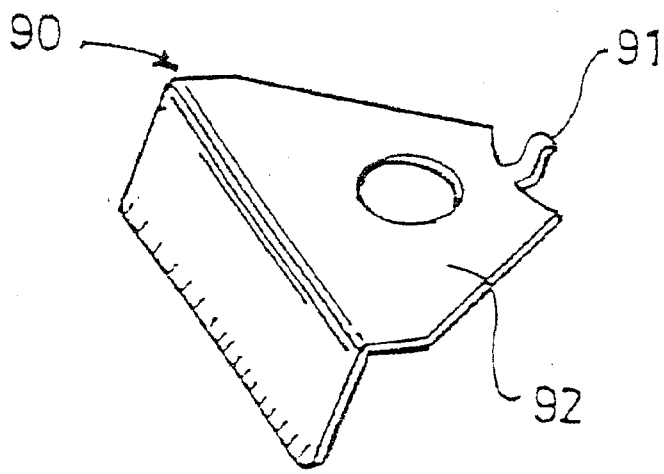
Figure 10:
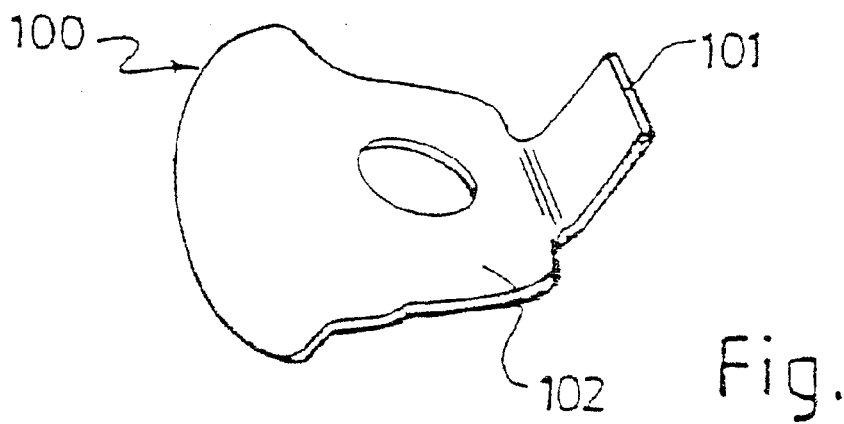

The heat shield 28 and planar mid-section 24 are similar to those of known prior art protective clips 80,90,100, illustrated in FIGS. 8 to 10, which are respectively used to protect ball and socket joints of the type described above on the following models of motor cars: PEUGEOT 106, PEUGEOT 205, both trademarks of Automobiles Peugeot of Paris, France, and RENAULT LAGUNA, a trademark of Regie Nationale Des Usines Renault of Boulogne-Billancourt, France. These prior art protective clips do not, however, have a spring clip, but rather each a tab 81,91,101, which extends upwards from a planar mid-section 82,92, 102. Each tab 81,91,101 is initially in the plane of the planar mid-section 82,92,102 when the protective clip is fitted to the ball and socket joint. Each tab 81,91,101 is then bent upwards into engagement with a corresponding feature on a knuckle, such as a recess in the cases of the clips 81 and 91, or a flat surface on the knuckle, in the case the clip 100. The prior art protective clips therefore must be fitted to the lower portion of a knuckle in a two-step operation: first by offering up the clip to an underside of the knuckle, and then after connection of a ball and socket joint to the knuckle, by bending or crimping the tab into engagement with a corresponding feature either on the underside or laterally facing side of the knuckle. If the bending or crimping operation is not properly carried out, the heat shield may not be correctly oriented with respect to a disc of a disc brake assembly.

In contrast, the protective clip 10 of the present invention has a pre-formed spring clip 34 with a concave inner surface 35 which faces generally towards the planar mid-section 24. An end 37 of the spring clip is curved or looped around above the planar mid-section, and has a protrusion 39 towards the hole 26 in the planar mid-section 24. The protrusion has an upwardly directed lip 41.

The fitting of the protective clip 10 according to the invention to the ball and socket joint 7 will now be described in more detail with reference particularly to FIG. 7. The lip 41 is adapted to permit the spring clip 34 to ride up onto a convex outer surface 43 of the knuckle lower portion 4 so that the protective clip may be press-fitted in a horizontal direction to the knuckle. The flat planar mid-section 24 then slides relative to a corresponding flat undersurface 47 of the knuckle lower portion 4, until the protrusion 39 at the end of the spring clip seats into a recess 45 in a face of the knuckle opposite the flat undersurface 47.

The recess 45 in the knuckle is an open end of a vertical bore 36 through the knuckle lower portion 4, the bore 36 being aligned with the hole 26 in the planar mid-section 24 when the protective clip 10 has been press-fitted to the knuckle lower portion 4. The vertical bore 36 is intersected by a slot 38 lying in a vertical plane and has clearance for a stud 40, which is inserted into the open lower end of the bore 36 after the protective clip has been fitted to the knuckle lower portion 4. At the lower end of the stud 40 is a ball 42 of the ball and socket joint 7. Grease (not illustrated) protectively packs the gaiter 11, and also the slot 38. The rubber gaiter 11 has an upwardly directed rim 51, which makes a sliding and sealing contact with a lower face 53 of the clip planar mid-section 24.

After insertion of the stud 40 into the bore 38, a bolt 44 is inserted through a horizontal bore 46 in the knuckle lower portion 4. The horizontal bore 46 intersects the slot 38 and part of the vertical bore 36 so that the bolt 44 may seat against an annular groove 48 in the circumference of the stud 40.

The bolt 44 may then be tightened by means of a nut 50, so that the slot 38 is squeezed, which constricts the vertical bore 36 so gripping firmly the stud 40. The slot 38, however, is not squeezed shut, but remains open along the convex outer surface 43 of the knuckle lower portion.

Importantly, the protective clip 10 has a knuckle engaging feature 49 which is non-coplanar with the planar mid-section 24 and which is therefore adapted to locate with this open slot 38. The slot 38 therefore serves as a corresponding clip location feature, as the protective clip 10 is press-fitted with the knuckle lower portion 4. The knuckle engaging feature is a bridge or arch-like strap of metal that is formed during manufacture of the clip from a pair of parallel cuts punched into the sheet metal, the strap then being bent into a convex shape which projects away from the concave inner surface 35 of the spring clip 34. One end of the bridge 49 is near the planar mid-section second edge 32. The bridge 49 extends longitudinally in the same direction as the spring clip, and has a similar radius of curvature, so that the sheet metal of the bridge 39 is not significantly stretched and thinned, or shortened and thickened, during the manufacturing of the clip. This together with the feature of the bridge 39 being connected to the spring clip at both ends of the bridge, makes the bridge 39 a much more mechanically rigid knuckle engaging feature than the tabs 81, 91, 101 of the prior art protective clips 80, 90, 100.

During the process of press-fitting the protective clip 10 to the lower portion of the knuckle 4, a point comes when the spring clip projection 39 begins to seat into the recess 45. Because the spring clip 34 is outwardly sprung and pre-biased as the spring clip lip 41 rides over the convex surface 43, the protective clip is automatically pulled into final engagement with the knuckle lower portion 4 as the projection 39 seats fully into the recess 45. If the knuckle engaging feature 49 is not already aligned with the slot, then the worker fitting the protective clip may make a slight adjustment left/right until the bridge 39 automatically engages with the slot 38. This positive engagement between the knuckle engaging feature and the slot ensures that the heat shield 28 remains oriented towards with brake disc 5, so protecting the rubber gaiter 11 from heat radiated by the discs 5 when hot.

The engagement also helps to ensure that there is a close fit between the concave surface 35 of the spring clip and the corresponding convex surface 43 of the knuckle lower portion 4. Therefore, although the knuckle lower portion may be splashed with, say salty water and road grit, this will not be able to run down the slot 38 and hence dislodge protective packing grease in the slot 38. The spring clip therefore helps to protect the gaiter 11 and grease packed inside the gaiter, so that the gaiter lip 51 can continue to make a good sliding and sealing contact with the flat underside 53 of the protective clip mid-section 24.

The protective clip according to the invention may therefore be fitted quickly and conveniently to a knuckle lower portion about a motor vehicle steering linkage ball joint on a production line in an essentially one-step operation, with no need for further bending or crimping of metal in order to keep a heat shield in alignment with a brake disc. The spring clip part of the protective clip provides a spring bias to help seat the clip on the knuckle lower portion, as well as to cover over a slot in the knuckle. These features provide an economical solution to the problem of how to prevent a rubber gaiter and a steering linkage ball and socket joint from deterioration due to heat radiated from the disc brakes, and from water and dissolved or entrained contaminants from washing away protective grease and causing corrosion and possible eventual separation of the ball and socket joint.

What is claimed is:

1. A protective clip (10) for use on a motor vehicle steering linkage ball joint (7), said protective clip comprising:

a planar mid-section (24) having a hole (26) therein so as to allow a ball mounting shaft (40) to pass therethrough;

a heat shield portion (28) extending transversely away from a first edge (30) of the planar mid-section (24);

a steering knuckle engaging feature (49) being proximate to a second edge (32) of the planar mid-section (24) opposite the first edge (30), and at least a portion of the engaging feature (48) being partially spaced apart from the planar mid-section (24) and the first edge (30); and a spring clip portion (34) extending from the second edge (32) and concave towards the planar mid-section (24).

2. A protective clip (10) as claimed in claim 1, in which the spring clip portion (34) is concave to oppose the planar mid-section (24).

3. A protective clip (10) as claimed in claim 2, in which the spring clip (34) opposes the hole (26) in the planar mid-section (24).

4. A protective clip (10) as claimed in claim 1, in which the spring clip (34) is curved into a partial loop towards the planar mid-section (24).

5. A protective clip (10) as claimed in claim 1, in which the engaging feature (49) is on the spring clip (34).

6. A protective clip (10) as claimed in claim 5, in which the engaging feature (49) projects from a surface (35) of the spring clip (34), the engaging feature (49) being concave towards the planar mid-section (24).

7. A protective clip (10) as claimed in claim 1, in which one end of the engaging feature (49) is proximate the second edge (32) of the planar mid-section (24).

8. A protective clip (10) for use on a motor vehicle steering linkage ball joint (7), said protective clip comprising:

a planar mid-section (24) having a hole (26) therein so as to allow a ball mounting shaft (40) to pass therethrough;

a heat shield portion (28) extending transversely away from a first edge (30) of the planar mid-section (24);

a steering knuckle engaging feature (49) provided in the form of a strap (49) being proximate to a second edge (32) of the planar mid-section (24) opposite the first edge (30), the strap (49) bridging across the surface (35) of the spring clip (34), and being concave towards the planar mid-section (24); and a spring clip portion (34) extending from the second edge (32) and concave towards the planar mid-section (24).

9. A protective clip (10) in combination with a motor vehicle steering linkage ball joint (7), said protective clip comprising:

a planar mid-section (24) having a hole (26) therein so as to allow a ball mounting shaft (40) to pass therethrough;

a heat shield portion (28) extending transversely away from a first edge (30) of the planar mid-section (24);

a steering knuckle engaging feature (49) being proximate to a second edge (32) of the planar mid-section (24) opposite the first edge (30), and at least a portion of the engaging feature (49) being partially spaced apart from the planar mid-section (24) and the first edge (30); and a spring clip portion (34) extending from the second edge (32) and concave towards the planar mid-section (24); and wherein the motor vehicle steering linkage ball joint includes a steering knuckle (6), and wherein the engaging feature (49) of the protective clip engages the steering knuckle (6).

* * * * *